United States Patent
Chen et al.

(10) Patent No.: US 7,577,213 B2
(45) Date of Patent: Aug. 18, 2009

(54) HIERARCHICAL 8PSK PERFORMANCE

(75) Inventors: Ernest C. Chen, San Pedro, CA (US); Joseph Santoru, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/176,533

(22) Filed: Jul. 21, 2008

(65) Prior Publication Data

US 2008/0298505 A1 Dec. 4, 2008

Related U.S. Application Data

(63) Continuation of application No. 10/519,322, filed as application No. PCT/US03/20862 on Jul. 1, 2003, now Pat. No. 7,418,060.

(60) Provisional application No. 60/392,861, filed on Jul. 1, 2002.

(51) Int. Cl.
H04L 27/00 (2006.01)
(52) U.S. Cl. ....................... 375/316
(58) Field of Classification Search ............. 375/216, 375/262, 279, 316, 324, 329, 331, 333; 370/207; 714/786; 348/638, 725, 726
See application file for complete search history.

(56) References Cited

U.S. PATENT DOCUMENTS

| | | | |
|---|---|---|---|
| 3,076,180 A | 1/1963 | Havens et al. | |
| 3,383,598 A | 5/1968 | Sanders | |
| 3,878,468 A | 4/1975 | Falconer et al. | |
| 3,879,664 A | 4/1975 | Monsen | |
| 3,974,449 A | 8/1976 | Falconer | |
| 4,039,961 A | 8/1977 | Ishio et al. | |

(Continued)

FOREIGN PATENT DOCUMENTS

DE 3642213 12/1986

(Continued)

OTHER PUBLICATIONS

EPO Summons to attend Oral Proceedings dated Jul. 18, 2008 in European counterpart Application No. 02728894.3 corresponding to U.S. Appl. No. 09/844,401, filed Apr. 27, 2001 by Ernest Chen, now issued Apr. 24, 2007 as US Patent No. 7,209,524.

(Continued)

*Primary Examiner*—Sam K Ahn

(57) ABSTRACT

A method and receiver systems for demodulating and decoding a hierarchically modulated signal, e.g. an 8PSK signal, are disclosed. An exemplary method includes demodulating and processing (502) the hierarchically modulated signal (202) to produce symbols (212) from the first modulation at the first hierarchical level, applying information (504) from a plurality of the symbols from the first modulation at the first hierarchical level in subtracting (214) from the demodulated hierarchically modulated signal to obtain the second modulation at the second hierarchical level and processing (506) the second modulation at the second hierarchical level to produce second symbols (222) from the demodulated second signal. The hierarchically modulated signal comprises a non-uniform 8PSK signal. Applying the information from the plurality of the symbols from the first modulation can be achieved by applying the symbols after error correction. A decision-directed demodulation of the first modulation can also be used to further improve performance.

9 Claims, 6 Drawing Sheets

U.S. PATENT DOCUMENTS

| | | | |
|---|---|---|---|
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,422,175 A | 12/1983 | Bingham et al. | |
| 4,484,337 A | 11/1984 | Leclert et al. | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A | 5/1989 | Borth et al. | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffat et al. | |
| 5,043,734 A | 8/1991 | Niho | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A | 2/1994 | Chennakeshu et al. | |
| 5,317,599 A | 5/1994 | Obata | |
| 5,329,311 A | 7/1994 | Ward et al. | |
| 5,337,014 A | 8/1994 | Najle et al. | |
| 5,353,307 A | 10/1994 | Lester et al. | |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A | 11/1995 | Koslov | |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,592,481 A | 1/1997 | Wiedeman et al. | |
| 5,602,868 A | 2/1997 | Wilson | |
| 5,603,084 A | 2/1997 | Henry et al. | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,644,592 A | 7/1997 | Divsalar et al. | |
| 5,648,955 A | 7/1997 | Jensen et al. | |
| 5,732,113 A | 3/1998 | Schmidl et al. | |
| 5,790,555 A | 8/1998 | Narahashi et al. | |
| 5,793,818 A | 8/1998 | Claydon et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,937,004 A | 8/1999 | Fasulo et al. | |
| 5,940,025 A | 8/1999 | Koehnke et al. | |
| 5,940,750 A | 8/1999 | Wang | |
| 5,946,625 A | 8/1999 | Hassan et al. | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A | 10/1999 | Hummelgaard et al. | |
| 5,970,429 A | 10/1999 | Martin | |
| 5,978,652 A | 11/1999 | Burr et al. | |
| 5,987,068 A | 11/1999 | Cassia et al. | |
| 5,995,536 A | 11/1999 | Arkhipkin et al. | |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A | 6/2000 | Rahnema | |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,172,970 B1 | 1/2001 | Ling et al. | |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 | 2/2001 | Aman et al. | |
| 6,212,360 B1 | 4/2001 | Fleming et al. | |
| 6,219,095 B1 | 4/2001 | Zhang et al. | |
| 6,246,717 B1 | 6/2001 | Chen et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |
| 6,314,441 B1 | 11/2001 | Raghunath | |
| 6,320,464 B1 | 11/2001 | Suzuki et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,335,951 B1 | 1/2002 | Cangiani et al. | |
| 6,366,309 B1 | 4/2002 | Siegle | |
| 6,369,648 B1 | 4/2002 | Kirkman | |
| 6,377,116 B1 | 4/2002 | Mattsson et al. | |
| 6,389,002 B1 | 5/2002 | Schilling | |
| 6,411,659 B1 | 6/2002 | Liu et al. | |

| | | |
|---|---|---|
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Rudolph et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 | 6/2003 | Arslan et al. |
| 6,577,353 B1 | 6/2003 | Welles et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,721,300 B1 | 4/2004 | Akiba et al. |
| 6,731,622 B1 | 5/2004 | Frank et al. |
| 6,731,700 B1 | 5/2004 | Yakhnich et al. |
| 6,741,662 B1 | 5/2004 | Francos et al. |
| 6,745,050 B1 | 6/2004 | Forsythe et al. |
| 6,754,872 B2 | 6/2004 | Zhang et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,891,897 B1 | 5/2005 | Bevan et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 * | 1/2006 | Uesugi et al. ............... 714/794 |
| 6,999,510 B2 | 2/2006 | Batruni |
| 7,041,406 B2 | 5/2006 | Schuler et al. |
| 7,054,384 B1 | 5/2006 | Ma et al. |
| 7,073,116 B1 | 7/2006 | Settle et al. |
| 7,079,585 B1 * | 7/2006 | Settle et al. ................. 375/261 |
| 7,154,958 B2 | 12/2006 | Dabak et al. |
| 7,161,931 B1 | 1/2007 | Li et al. |
| 7,173,981 B1 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0016926 A1 | 8/2001 | Riggle |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 | 7/2003 | Rouphael et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0011716 A1 * | 1/2007 | Koslov et al. ............... 725/135 |
| 2007/0121718 A1 | 5/2007 | Wang et al. |
| 2007/0297533 A1 * | 12/2007 | Chitrapu et al. ............. 375/308 |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1065854 | 1/2001 |
| EP | 1335512 | 8/2003 |
| FR | 2696295 | 4/1994 |
| FR | 2724522 | 3/1996 |
| JP | 2-005631 | 1/1990 |
| JP | 2-095033 | 4/1990 |
| JP | 03139027 | 6/1991 |
| JP | 5-041683 | 2/1993 |
| JP | 5-114878 | 5/1993 |
| JP | 5-252084 | 9/1993 |
| JP | 07-038615 | 2/1995 |
| JP | 2000-022659 | 1/2000 |
| JP | 2001-244832 | 9/2001 |
| JP | 2002118611 | 4/2002 |
| JP | 2002-300132 | 10/2002 |
| KR | 10-2001-0019997 | 3/2001 |
| KR | 2001 0019997 | 3/2001 |
| WO | 9836467 | 8/1998 |
| WO | WO 99/00957 | 1/1999 |
| WO | WO 99/20001 | 4/1999 |
| WO | WO 99/23718 | 5/1999 |
| WO | WO 99/33203 | 7/1999 |
| WO | WO 00/79753 | 12/2000 |
| WO | WO 01/13532 | 2/2001 |
| WO | WO 01/19013 | 3/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 2005/074171 | 8/2005 |
| WO | WO 2005/086444 | 9/2005 |

OTHER PUBLICATIONS

Taiwanese Office Action dated May 14, 2008 in Taiwan counterpart Application No. 092129629 corresponding to U.S. Appl. No. 10/532,631, filed Apr. 25, 2005 by Paul R. Anderson et al.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

The Authoritive Dictionary of IEEE Standards Terms; Seventh Edition, pp. 1047—definition of "signal"; 2000.

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Arslan, Huseyin and Molnar, Karl; "Co-Channel Interference Cancellation with Successive Cancellation in Narrowband TDMA Systems"; Wireless Communications and Networking Conference; 2000; WCNC; 2000 IEEE; Sep. 23-28, 2000; Piscataway, New Jersey, USA; pp. 1070-1074; XP010532692; ISBN: 0-89-3-6596-8; Chapters I and III.

Arslan, Huseyin and Molnar, Karl; "Successive Cancellation of Adjacent Channel Signals in FDMA/TDMA Digital Mobile Radio Systems"; Vehicular Technology Conference; 48$^{th}$ IEEE VTC; Ottawa, Canada; May 18-21, 1998; New York, New York, USA; vol. 3; May 18, 1998; pp. 1720-1724; XP010288123.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

Scott, R.P. et al.; Ultralow Phase Noise Ti:sapphire Laser Rivals 100 MHz Crystal Oscillator; Nov. 11-15, 2001; IEEE-Leos; pp. 1-2.

El-Gamal, Abbas and Cover, Thomas M.; "Multiple User Information Theory"; Proceedings of IEEE; vol. 68, No. 12; Dec. 1980; pp. 1466-1483, XP007904837.

Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting; IEEE Service Center; Piscataway, New Jersey, USA; vol. 41, No. 2; Jun. 1, 1997; pp. 191-198; XP011006070.

The Authoritative Dictionary of IEEE Standards Terms; Seventh Edition; pp. 1047; publication year: 2000.

Non-final Office Action dated Apr. 1, 2008 in U.S. Appl. No. 10/961,579, filed Oct. 8, 2004 by Ernest C. Chen.

Notice of Allowance dated Jun. 20, 2007 in U.S. Appl. No. 10/693,135, filed Oct. 24, 2003 by Ernest C. Chen.

Notice of Allowance dated Jul. 29, 2007 in U.S. Appl. No. 10/532,632, filed Apr. 25, 2005 by Ernest C. Chen et al.

Notice of Allowance dated May 6, 2008 in U.S. Appl. No. 10/532,632, filed Apr. 25, 2005 by Ernest C. Chen et al.

Notice of Allowance dated Sep. 6, 2007 in U.S. Appl. No. 10/692,491, filed Oct. 24, 2003 by Ernest C. Chen.

Notice of Allowance dated Aug. 29, 2007 in U.S. Appl. No. 11/603,776, filed Nov. 22, 2006 by Ernest C. Chen et al.

Non-final Office Action dated Dec. 27, 2007 in U.S. Appl. No. 10/519,375, filed Dec. 22, 2004 by Ernest C. Chen et al.

Final Rejection dated Jun. 24, 2008 in U.S. Appl. No. 10/519,375, filed Dec. 22, 2004 by Ernest C. Chen et al.

EPO Communication dated Mar. 7, 2008 in European counterpart Application No. 03742393.6 corresponding to U.S. Appl. No. 10/519,375, filed Dec. 22, 2004 by Ernest C. Chen et al.

Canadian Office Action dated Sep. 12, 2007 in Canadian counterpart Application No. 2491259 corresponding to U.S. Appl. No. 10/519,375, filed Dec. 22, 2004 by Ernest C. Chen et al.

Non-final Office Action dated Dec. 11, 2007 in U.S. Appl. No. 10/913,927, filed Aug. 5, 2004 by Ernest C. Chen.

Non-final Office Action dated Jun. 17, 2008 in U.S. Appl. No. 10/913,927, filed Aug. 5, 2004 by Ernest C. Chen.

Non-final Office Action dated Nov. 15, 2007 in U.S. Appl. No. 11/619,173, filed Jan. 2, 2007 by Ernest C. Chen et al.

Notice of Allowance dated May 8, 2008 in U.S. Appl. No. 11/619,173, filed Jan. 2, 2007 by Ernest C. Chen et al.

Non-final Office Action dated Nov. 19, 2007 in U.S. Appl. No. 10/532,631, filed Apr. 25, 2005 by Paul R. Anderson et al.

Notice of Allowance dated May 6, 2008 in U.S. Appl. No. 10/532,631, filed Apr. 25, 2005 by Paul R. Anderson et al.

Non-final Office Action dated Nov. 16, 2007 in U.S. Appl. No. 10/691,032, filed Oct. 22, 2003 by Weizheng Wang et al.

Notice of Allowance dated Dec. 26, 2007 in U.S. Appl. No. 10/532,619, filed Apr. 25, 2005 by Ernest C. Chen.

Canadian Office Action dated Apr. 22, 2008 in Canadian counterpart Application No. 2502924 corresponding to U.S. Appl. No. 10/532,619, filed Apr. 25, 2005 by Ernest C. Chen.

EPO Communication dated May 6, 2008 in European counterpart Application No. 03777627.5 corresponding to U.S. Appl. No. 10/532,619, filed Apr. 25, 2005 by Ernest C. Chen.

Non-final Office Action dated Mar. 3, 2008 in U.S. Appl. No. 11/656,662, filed Jan. 22, 2007 by Ernest C. Chen.

Non-final Office Action dated May 31, 2007 in U.S. Appl. No. 10/692,539, filed Oct. 24, 2003 by Ernest C. Chen.

Notice of Allowance dated Sep. 20, 2007 in U.S. Appl. No. 10/692,539, filed Oct. 24, 2003 by Ernest C. Chen.

Notice of Allowance dated Mar. 25, 2008 in U.S. Appl. No. 11/653,517, filed Jan. 16, 2007 by Ernest C. Chen.

Non-final Office Action dated Oct. 16, 2007 in U.S. Appl. No. 10/962,346, filed Oct. 8, 2004 by Ernest C. Chen.

Non-final Office Action dated Apr. 30, 2008 in U.S. Appl. No. 10/962,346, filed Oct. 8, 2004 by Ernest C. Chen.

Japanese Office Action dated Mar. 4, 2008 in Japanese counterpart Application No. 2004-297297 corresponding to U.S. Appl. No. 10/962,346, filed Oct. 8, 2004 by Ernest C. Chen.

EPO Communication dated Feb. 26, 2008 in European counterpart Application No. 04256234.8 corresponding to U.S. Appl. No. 10/962,346, filed Oct. 8, 2004 by Ernest C. Chen.

Notice of Allowance dated Mar. 12, 2008 in U.S. Appl. No. 11/655,001, filed Jan. 18, 2007 by Weizheng Wang et al.
EPO Communication dated Mar. 11, 2008 in European counterpart Application No. 03777694.5 corresponding to U.S. Appl. No. 10/532,509, filed Oct. 17, 2003 by Ernest C. Chen et al., now issued as US Patent No. 7,230,480.
Notice of Allowance dated Apr. 21, 2008 in U.S. Appl. No. 10/519,322, filed Dec. 23, 2004 by Ernest C. Chen et al.
EPO Communication dated Feb. 7, 2008 in European counterpart Application No. 03742400.9 corresponding to U.S. Appl. No. 10/519,322, filed Dec. 23, 2004 by Ernest C. Chen et al.
Canadian Office Action dated Apr. 30, 2007 in Canadian counterpart Application No. 2489569 corresponding to U.S. Appl. No. 10/519,322, filed Dec. 23, 2004 by Ernest C. Chen et al.
European Search Report and Search Opinion dated Jun. 13, 2008 in European counterpart Application No. 07075745.5 corresponding to U.S. Appl. No. 09/844,401, filed Apr. 27, 2001 by Ernest C. Chen, now issued as US Patent No. 7,209,524.
Norwegian Office Action dated Nov. 15, 2007 in Norwegian counterpart Application No. 20026115 corresponding to U.S. Appl. No. 09/844,401, filed Apr. 27, 2001 by Ernest C. Chen, now issued as US Patent No. 7,209,524.
EPO Communication dated Aug. 3, 2007 in European counterpart Application No. 03794510.2 corresponding to U.S. Appl. No. 10/236,414, filed Sep. 6, 2002 by Ernest C. Chen et al.
EPO Communication dated Apr. 4, 2008 in European counterpart Application No. 03757359.9 corresponding to U.S. Appl. No. 10/165,710, filed Jun. 7, 2002 by Ernest C. Chen.
EPO Communication dated May 6, 2008 in European counterpart Application No. 03774848.0 corresponding to U.S. Appl. No. 10/532,582, filed Apr. 25, 2005 by Ernest C. Chen et al., now issued Feb. 6, 2007 as US Patent No. 7,173,977.
Notice of Allowance dated Jun. 13, 2008 in U.S. Appl. No. 10/532,524, filed Apr. 25, 2005 by Ernest C. Chen et al.
EPO Communication dated Oct. 17, 2008 in European Patent Application No. 03774848.0 filed Oct. 15, 2003 by Ernest Chen et al.
EPO Communication dated Nov. 18, 2008 in European Patent Application No. 03742393.6 filed Jul. 3, 2003 by Ernest Chen et al.
Non-final Office Action dated Dec. 3, 2008 in U.S. Appl. No. 10/913,927, filed Aug. 5, 2004 by Ernest Chen.
Notice of Allowance dated Dec. 2, 2008 in U.S. Appl. No. 11/656,662, filed Jan. 22, 2007 by Ernest Chen et al.
Canadian Office Action dated Aug. 18, 2008 in Canadian Patent Application No. 2503532, filed Oct. 17, 2003 by Ernest Chen et al.
Chinese Office Action dated Aug. 22, 2008 in Chinese Patent Application No. 200410100591.6, filed Oct. 10, 2004 by Ernest Chen.
Notice of Allowance dated Oct. 23, 2008 in U.S. Appl. No. 10/962,346, filed Oct. 8, 2004 by Ernest Chen.
Notice of Allowance dated Oct. 23, 2008 in U.S. Appl. No. 10/961,579, filed Oct. 8, 2004 by Ernest Chen.
Final Rejection dated Sep. 9, 2008 in U.S. Appl. No. 11/656,662, filed Jan. 22, 2007 by Ernest Chen et al.
EPO Communication dated Feb. 24, 2009 in European Patent Divisional Application No. 07075745.5 filed Apr. 24, 2004 (parent filing date) by Ernest C. Chen.
Canadian Office Action dated Oct. 3, 2008 in Canadian Patent Application No. 2491259 filed Jul. 3, 2003 by Ernest Chen et al.
Non-final Office Action dated Mar. 5, 2009 in U.S. Appl. No. 10/519,375, filed Dec. 22, 2004 by Ernest C. Chen et al.
Non-final Office Action dated Mar. 17, 2009 in U.S. Appl. No. 12/329,456 filed Dec. 5, 2008 by Ernest C. Chen et al.
Israel Office Action dated Feb. 15, 2009 in Israel Patent Application No. 164482 filed Oct. 10, 2004 by Ernest C. Chen.

* cited by examiner

HIERARCHICAL 8PSK PERFORMANCE

CROSS REFERENCE TO RELATED APPLICATIONS

This application is a continuation of U.S. patent application Ser. No. 10/519,322, filed Dec. 23, 2004 and entitled "IMPROVING HIERARCHICAL 8PSK PERFORMANCE," by Ernest C. Chen et al., which was the National Stage of the International Application No. PCT/US2003020862, filed Jul. 1, 2003 and entitled "IMPROVING HIERARCHICAL 8PSK PERFORMANCE," Ernest C. Chen et al., which claims priority to U.S. Provisional Patent Application Ser. No. 60/392,861, filed on Jul. 1, 2002, and entitled "IMPROVING HIERARCHICAL 8PSK PERFORMANCE," by Ernest C. Chen et al., both of which applications are hereby incorporated by reference herein.

This application is related to U.S. patent application Ser. No. 09/844,401, filed on Apr. 27, 2001, and entitled "LAYERED MODULATION FOR DIGITAL SIGNALS", by Ernest C. Chen, now issued as U.S. Pat. No. 7,209,524, which application is hereby incorporated by reference herein.

This application is also related to the following applications:

Application Ser. No. 11/653,517, entitled "LAYERED MODULATION FOR DIGITAL SIGNALS," filed on Jan. 16, 2007, by Ernest C. Chen, which is a continuation of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/165,710, entitled "SATELLITE TWTA ON-LINE NON-LINEARITY MEASUREMENT," filed on Jun. 7, 2002, by Ernest C. Chen, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/236,414, entitled "SIGNAL, INTERFERENCE AND NOISE POWER MEASUREMENT," filed on Sep. 6, 2002, by Ernest C. Chen and Chinh Tran, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,135, entitled "LAYERED MODULATION FOR ATSC APPLICATIONS," filed on Oct. 24, 2003, by Ernest C. Chen, which claims benefit to Provisional Patent Application 60/421,327, filed Oct. 25, 2002 and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/913,927, entitled "CARRIER TO NOISE RATIO ESTIMATIONS FROM A RECEIVED SIGNAL," filed on Aug. 5, 2004, by Ernest C. Chen, which is a continuation in part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/619,173, entitled "PREPROCESSING SIGNAL LAYERS IN LAYERED MODULATION DIGITAL SIGNAL SYSTEM TO USE LEGACY RECEIVERS," filed Jan. 2, 2007, which is a continuation of application Ser. No. 10/068,039, entitled "PREPROCESSING SIGNAL LAYERS IN LAYERED MODULATION DIGITAL SIGNAL SYSTEM TO USE LEGACY RECEIVERS," filed on Feb. 5, 2002, by Ernest C. Chen, Tiffany S. Furuya, Philip R. Hilmes, and Joseph Santoru now issued as U.S. Pat. No. 7,245,671, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,421, entitled "FAST ACQUISITION OF TIMING AND CARRIER FREQUENCY FROM RECEIVED SIGNAL," filed on Oct. 24, 2003, by Ernest C. Chen, now issued as U.S. Pat. No. 7,151,807, which claims priority to Provisional Patent Application Ser. No. 60/421,292, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/692,491, entitled "ONLINE OUTPUT MULTIPLEXER FILTER MEASUREMENT," filed on Oct. 24, 2003, by Ernest C. Chen, which claims priority to Provisional Patent Application 60/421,290, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/603,776, entitled "DUAL LAYER SIGNAL PROCESSING IN A LAYERED MODULATION DIGITAL SIGNAL SYSTEM," filed on Nov. 22, 2006, by Ernest C. Chen, Tiffany S. Furuya, Philip R. Hilmes, and Joseph Santoru, which is a continuation of application Ser. No. 10/068,047, entitled "DUAL LAYER SIGNAL PROCESSING IN A LAYERED MODULATION DIGITAL SIGNAL SYSTEM," filed on Feb. 5, 2002, by Ernest C. Chen, Tiffany S. Furuya, Philip R. Hilmes, and Joseph Santoru, now issued as U.S. Pat. No. 7,173,981, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/691,032, entitled "UNBLIND EQUALIZER ARCHITECTURE FOR DIGITAL COMMUNICATION SYSTEMS," filed on Oct. 22, 2003, by Weizheng W. Wang, Tung-Sheng Lin, Ernest C. Chen, and William C. Lindsey, which claims priority to Provisional Patent Application Ser. No. 60/421,329, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/962,346, entitled "COHERENT AVERAGING FOR MEASURING TRAVELING WAVE TUBE AMPLIFIER NONLINEARITY," filed on Oct. 8, 2004, by Ernest C. Chen, which claims priority to Provisional Patent Application Ser. No. 60/510,368, filed Oct. 10, 2003, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/655,001, entitled "AN OPTIMIZATION TECHNIQUE FOR LAYERED MODULATION," filed on Jan. 18, 2007, by Weizheng W. Wang, Guancai Zhou, Tung-Sheng Tin, Ernest C. Chen, Joseph Santoru, and William Lindsey, which claims priority to Provisional Patent Application 60/421,293, filed Oct. 25, 2002, and which is a continuation of application Ser. No. 10/693,140, entitled "OPTIMIZATION TECHNIQUE FOR LAYERED MODULATION," filed on Oct. 24, 2003, by Weizheng W. Wang, Guancai Zhou, Tung-Sheng Tin, Ernest C. Chen, Joseph Santoru, and William Lindsey, now issued as U.S. Pat. No. 7,184,489, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/656,662, entitled "EQUALIZERS FOR LAYERED MODULATION AND OTHER SIGNALS," filed on Jan. 22, 2007, by Ernest C. Chen, Tung-Sheng Lin, Weizheng W. Wang, and William C. Lindsey, which claims priority to Provisional Patent Application 60/421,241, filed Oct. 25, 2002, and which is a continuation of application Ser. No. 10/691,133, entitled "EQUALIZERS FOR LAYERED MODULATED AND OTHER SIGNALS," filed on Oct. 22, 2003, by Ernest C. Chen, Tung-Sheng Lin, Weizheng W. Wang, and William C. Lindsey, now issued as U.S. Pat. No. 7,184,473, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/961,579, entitled "EQUALIZATION FOR TWTA NONLINEARITY MEASUREMENT" filed on Oct. 8, 2004, by Ernest C. Chen, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,632, entitled "LOWER COMPLEXITY LAYERED MODULATION SIGNAL PROCESSOR," filed on Apr. 25, 2005, by Ernest C. Chen, Weizheng W. Wang, Tung-Sheng Lin, Guangcai Zhou, and Joe Santoru, which is a National Stage Application of PCT US03/32264, filed Oct. 10, 2003, which claims priority to Provisional Patent Application 60/421,331, entitled "LOWER COMPLEXITY LAYERED MODULATION SIGNAL PROCESSOR," filed Oct. 25, 2002, by Ernest C. Chen, Weizheng W. Wang, Tung-Sheng Lin, Guangcai Zhou, and Joe Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,631, entitled "FEEDER LINK CONFIGURATIONS TO SUPPORT LAYERED MODULATION FOR DIGITAL SIGNA," filed on Apr. 25, 2005, by Paul R. Anderson, Joseph Santom and Ernest C. Chen, which is a National Phase Application of PCT US03/33255, filed Oct. 20, 2003, which claims priority to Provisional Patent Application 60/421,328, entitled "FEEDER LINK CONFIGURATIONS TO SUPPORT LAYERED MODULATION FOR DIGITAL SIGNALS," filed Oct. 25, 2002, by Paul R. Anderson, Joseph Santom and Ernest C. Chen, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,619, entitled "MAXIMIZING POWER AND SPECTRAL EFFICIENCIES FOR LAYERED AND CONVENTIONAL MODULATIONS," filed on Apr. 25, 2005, by Ernest C. Chen, which is a National Phase Application of PCT Application US03/32800, filed Oct. 16, 2003, which claims priority to Provisional Patent Application 60/421,288, entitled "MAXIMIZING POWER AND SPECTRAL EFFICIENCIES FOR LAYERED AND CONVENTIONAL MODULATION," filed Oct. 25, 2002, by Ernest C. Chen and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, Application Ser. No. 10/532,524, entitled "AMPLITUDE AND PHASE MATCHING FOR LAYERED MODULATION RECEPTION," filed on Apr. 25, 2005, by Ernest C. Chen, Jeng-Hong Chen, Kenneth Shum, and Joungheon Oh, which is a National Phase Application of PCT Application US03/31199, filed Oct. 3, 2003, which claims priority to Provisional Patent Application 60/421,332, entitled "AMPLITUDE AND PHASE MATCHING FOR LAYERED MODULATION RECEPTION," filed Oct. 25, 2002, by Ernest C. Chen, Jeng-Hong Chen, Kenneth Shum, and Joungheon Oh, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, and also claims priority to;

Application Ser. No. 10/532,582, entitled "METHOD AND APPARATUS FOR TAILORING CARRIER POWER REQUIREMENTS ACCORDING TO AVAILABILITY IN LAYERED MODULATION SYSTEMS," filed on Apr. 25, 2005, by Ernest C. Chen, Paul R. Anderson and Joseph Santorn, now issued as U.S. Pat. No. 7,173,977, which is a National Stage Application of PCT Application US03/32751, filed Oct. 15, 2003, which claims priority to Provisional Patent Application 60/421,333, entitled "METHOD AND APPARATUS FOR TAILORING CARRIER POWER REQUIREMENTS ACCORDING TO AVAILABILITY IN LAYERED MODULATION SYSTEMS," filed Oct. 25, 2002, by Ernest C. Chen, Paul R. Anderson and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,509, entitled "ESTIMATING THE OPERATING POINT ON A NONLINEAR TRAVELING WAVE TUBE AMPLIFIER," filed on Apr. 25, 2005, by Ernest C. Chen and Shamik Maitra, now issued as U.S. Pat. No. 7,230,480, which is a National Stage Application of PCT Application US03/33130 filed Oct. 17, 2003, and which claims priority to Provisional Patent Application 60/421,289, entitled "ESTIMATING THE OPERATING POINT ON A NONLINEAR TRAVELING WAVE TUBE AMPLIFIER," filed Oct. 25, 2002, by Ernest C. Chen and Shamik Maitra, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,375, entitled "METHOD AND APPARATUS FOR LAYERED MODULATION," filed on Jul. 3, 2003, by Ernest C. Chen and Joseph Santoru, which is a National Stage Application of PCT US03/20847, filed Jul. 3, 2003, which claims priority to Provisional Patent Application 60/393,437 filed Jul. 3, 2002, and which is related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524.

BACKGROUND OF THE INVENTION

1. Field of the Invention

The present invention relates generally to systems for transmitting and receiving digital signals, and in particular, to systems for broadcasting and receiving digital signals using hierarchical modulation techniques.

2. Description of the Related Art

Digital signal communication systems have been used in various fields, including digital TV signal transmission, either terrestrial or satellite.

As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

Techniques have been identified for modifying the basic modulated QPSK signal to higher order modulation techniques (e.g. 8PSK) to allow additional data to be transmitted and received by upgraded or second generation receivers. These techniques are also backwards-compatible. That is, they allow legacy receivers to receive and process the same basic QPSK signal essentially as if the additional data was not present. One such technique is hierarchical modulation. Hierarchical modulation is a technique where the standard 8PSK constellation is modified to create a "non-uniform" 8PSK constellation that transmits two signals (1) a QPSK signal that can be configured so as to be backwards-compatible with existing receivers, and (2) a generally more power efficient, non-backwards compatible signal. The backwards-compatible QPSK signal can be used to transmit high priority (HP) data, while the non-backwards-compatible signal can be used to transmit low priority (LP) data. While the HP signal is constrained to be the legacy signal, the LP signal has more freedom and can be encoded more efficiently using an advanced forward error correction (FEC) coding scheme such as a turbo code.

The application of conventional hierarchical demodulation techniques can result in excessive symbol errors in the LP data signal. Such errors can occur because of the excessive tracking errors in the timing/carrier recovery loop used in demodulating HP data signal, and in excessive symbol errors from the demodulated HP data signal.

What is needed is a system and method for receiving hierarchically modulated symbols, such as in non-uniform 8PSK, that reduces LP data signal errors and provides for improved performance. The present invention satisfies that need.

SUMMARY OF THE INVENTION

To improve the demodulator performance, embodiments of the invention take advantage of the fact that quasi-error free (QEF) upper layer (UL) symbols are available from HP demodulation. These essentially error-free symbols may be used to completely cancel out the UL signal from the received signal for a cleaner lower layer (LL) signal. They may also be used in a second refining tracking loop to reduce the loop noise for further performance improvement. The result is improved LL signal quality and therefore better BER performance with this invention. The terminology UL and LL used in Layered modulation are synonymous to HP and LP used in hierarchical modulation, respectively.

Embodiments of the invention can reduce the signal to noise ratio (SNR) required for the non-uniform 8PSK technique, mentioned above, thereby reducing the required satellite amplifier output power. For example, in embodiments of the invention, the required satellite amplifier output power may be decreased for a given receiver antenna size, or the receiver antenna size may be reduced for a given satellite amplifier output power, etc.

A typical method of the invention comprises the steps of demodulating and processing a hierarchically modulated signal to produce symbols from a first modulation at a first hierarchical level, applying information from a plurality of the symbols from the first modulation at the first hierarchical level in subtracting from the demodulated hierarchically modulated signal to obtain a second modulation at a second hierarchical level and processing the second modulation at the second hierarchical level to produce second symbols from the demodulated second signal. The hierarchically modulated signal comprises a non-uniform 8PSK signal. The applied information from the plurality of symbols from the first modulation can be achieved through application of the symbols from the first modulation after error correction, e.g. forward error correction (FEC) or some other technique to improve the accuracy of the output symbols from the first modulation.

A typical receiver can include a first demodulator for demodulating the first modulation of the hierarchically modulated signal, a symbol decoder, communicatively coupled to the first demodulator, for producing symbols from the demodulated first signal, an error decoder, communicatively coupled to the symbol decoder, for producing an error corrected symbol stream from the symbols from the demodulated first signal, a re-encoder for re-encoding the error corrected symbol stream, a remodulator for remapping the error corrected symbol stream to a baseband signal, a subtractor, communicatively coupled to the remodulator and the first demodulator, for subtracting the remodulated symbol stream from the first signal to produce a second signal, and a second symbol decoder, communicatively coupled to the subtractor for producing second symbols from the demodulated second signal. If the hierarchically modulated signal is coherent, such as the hierarchical non-uniform 8PSK, a greatly reduced second level demodulator can be communicatively coupled between the subtractor and the second symbol decoder for demodulating the second signal from the subtractor and providing the demodulated second signal to the second symbol decoder.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Hierarchical Modulation/Demodulation

Figure 1A:
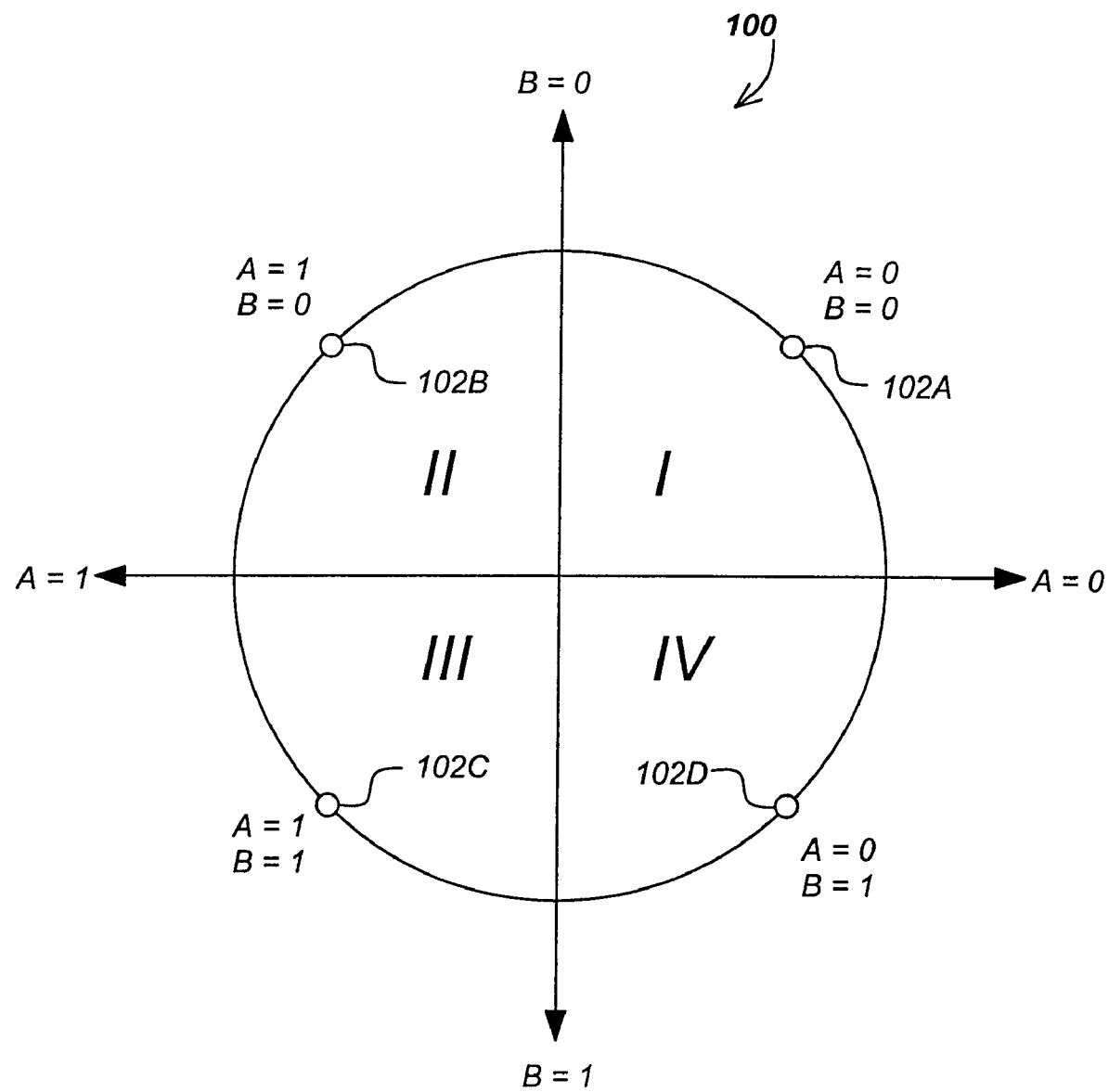
FIG. 1A is a diagram illustrating a QPSK signal constellation.

FIG. 1A is a diagram illustrating a signal constellation for a QPSK HP data signal. The signal constellation includes four possible signal outcomes 102 for A and B wherein {A,B}={0,0} (point 102A in the first quadrant), {1,0} (point 102B in the second quadrant), {1,1} (point 102C in the third quadrant), and {0,1} (point 102D in the fourth quadrant). An incoming and demodulated signal mapped to one of quadrants (I-IV) and the value for {A,B} (and hence, the value for the relevant portion of the HP data stream) is determined therefrom.

Figure 1B:
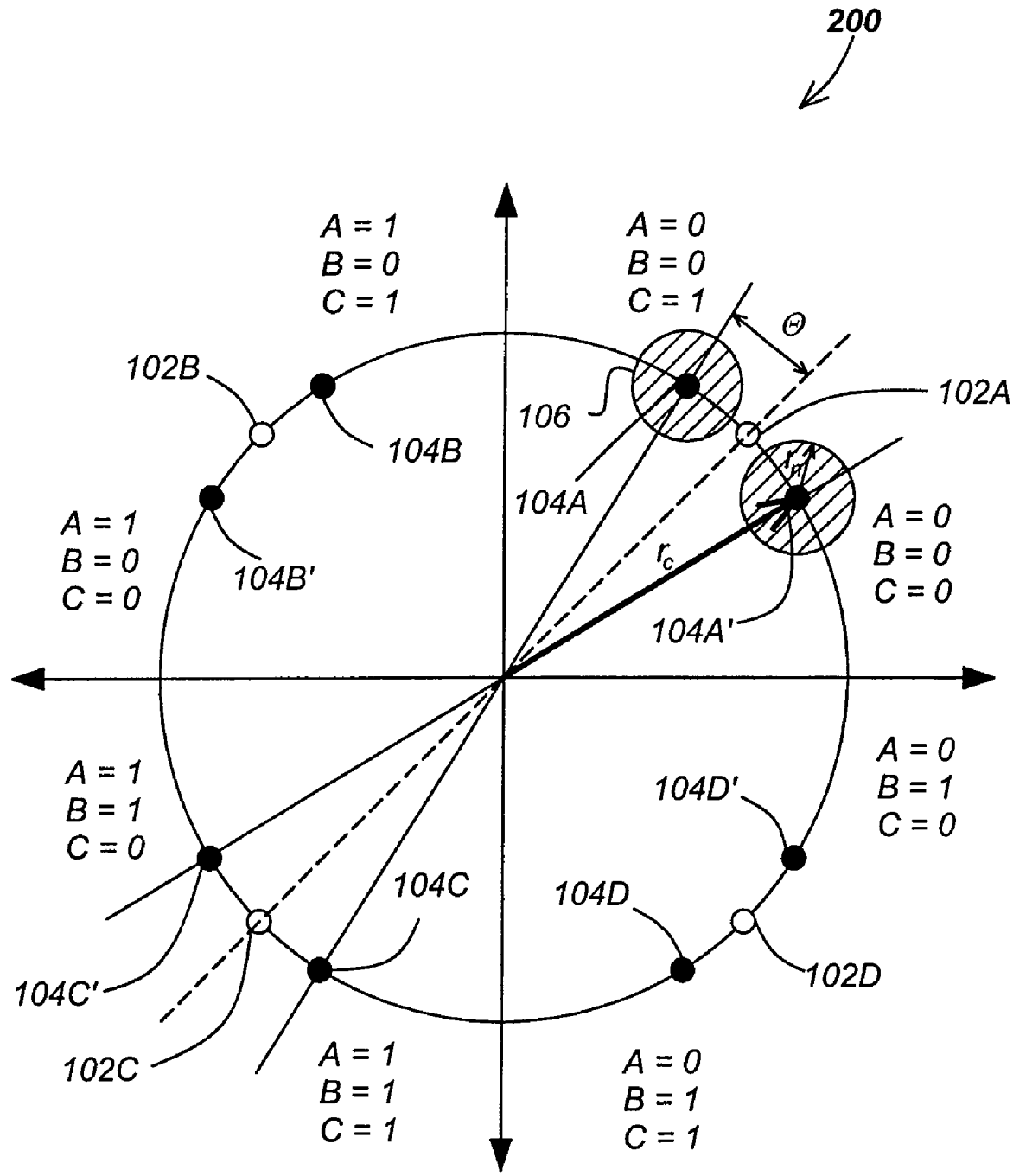
FIG. 1B is a diagram illustrating a non-uniform 8PSK signal constellation achieved through hierarchical modulation.

FIG. 1B is a diagram illustrating an 8PSK constellation created by addition of an LP data stream (represented by "C"). The application of hierarchical modulation adds two possible data values for "C" (C={1,0}) to each of the outcomes 102A-102D. For example, outcome 102A ({A,B}={0,0}) is expanded to an outcome pair 104A and 104A' ({A,B,C}={0,0,1} and {0,0,0}), respectively, with the members of the pair separated by an angle θ from {A,B}. This expands the signal constellation to include 8 nodes 104A-104D (each shown as solid dots).

If the angle θ is small enough, a legacy QPSK signal will receive both {A,B,C}={0,0,1} and {0,0,0} as {A,B}={0,0}. Only receivers capable of performing the second hierarchical level of modulation (LP) can extract the value for {C} as either {0} or {1}. This hierarchical signal structure has been termed "non-uniform" 8PSK.

The choice of the variable θ depends on a variety of factors. FIG. 1B, for example, presents the idealized data points without noise. Noise and errors in the transmission and/or reception of the signal vary the actual position of the nodes 104A-104D and 104A'-104D' in FIG. 1B. Noise regions 106 surrounding each node indicate areas in the constellation where the measured data may actually reside. The ability of the receiver to detect the symbols and accurately represent them depends on the angle θ, the power of the signal (e.g. the carrier), represented by $r_c$, and the noise (which can be represented by $r_n$). As can be seen by inspecting FIG. 1B, interference of LP into HP is reduced as signal power increases, or as θ decreases. The performance of this hierarchical modulating system can be expressed in terms of its carrier to interference ratio (C/I).

With a Layered-type demodulation as in this invention, the noise contributed by UL symbol errors to the extracted LL signal is avoided. With a Layered modulation mapping, the LP bit value for the 8 nodes alternates between 0 and 1 around the circle, i.e., {0,0,1,0,1,0,1,0,1}. This is in contrast with the {0,0,1,1,0,0,1,1} assignment in FIG. 1B for the conventional hierarchical modulation. Layered demodulation first FEC-decodes the upper layer symbols with a quasi-error free (QEF) performance, then uses the QEF symbols to extract the lower layer signal. Therefore, no errors are introduced by uncoded lower layer symbol errors. The delay memory required to obtain the QEF upper layer symbols for this application presents a small additional receiver cost, particularly in consideration of the ever-decreasing solid state memory cost over time.

In a conventional hierarchical receiver using non-uniform 8PSK, the LP signal performance can be impacted by HP demodulator performance. The demodulator normally includes a timing and carrier recovery loop. In most conventional recovery loops, a decision-directed feedback loop is included. Uncoded symbol decisions are used in the prediction of the tracking error at each symbol time of the recovery loop. The tracking loop would pick up an error vector whenever a symbol decision is in error; the uncoded symbol error rate (SER) could be as high as 6% in many legacy systems An FEC-corrected demodulator of this invention avoids the degradation.

Figure 2:
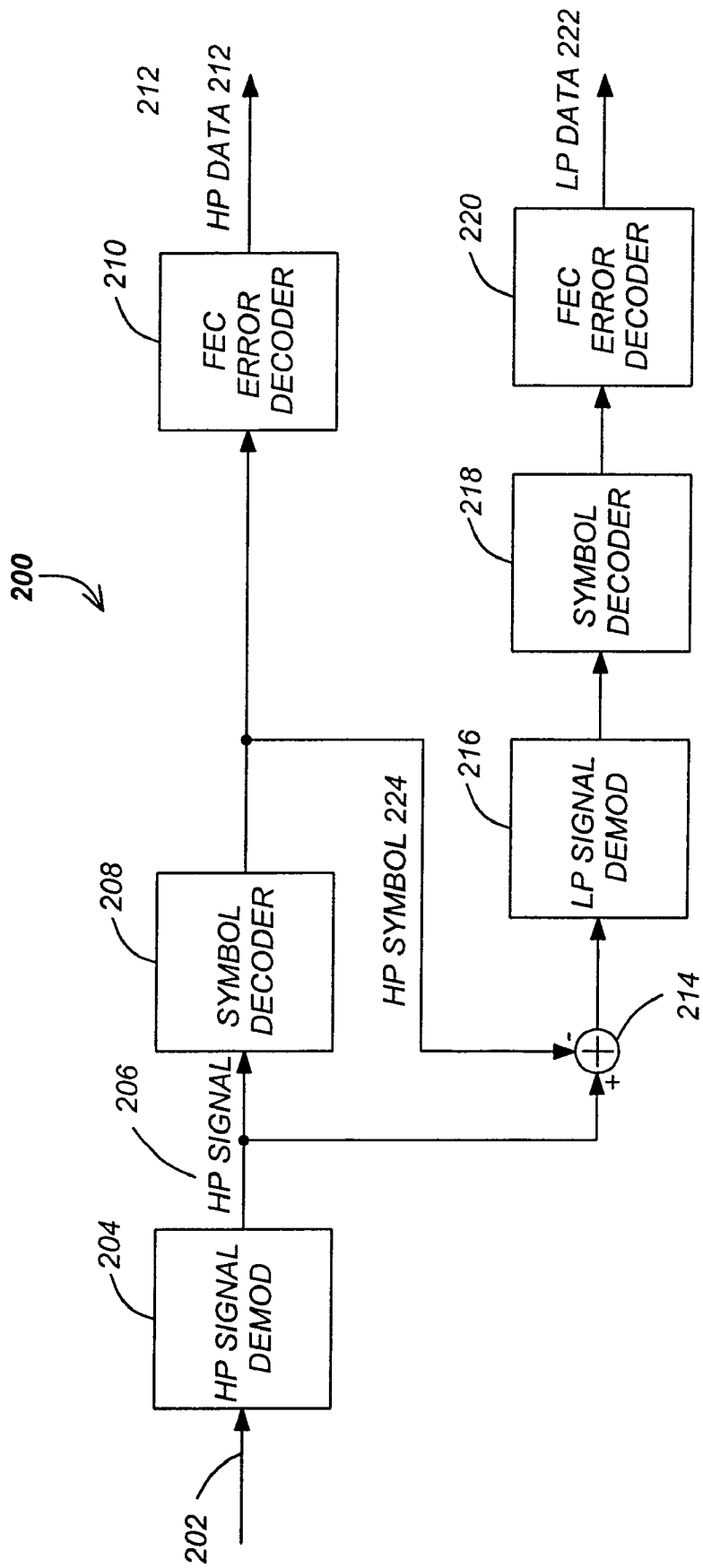
FIG. 2 is a diagram illustrating a system for demodulating a hierarchical non-uniform 8PSK signal such as that which is illustrated in FIG. 1B.

FIG. 2 is a diagram of an exemplary system for demodulating the hierarchically non-uniform 8PSK signal with Layer modulation, as described in FIG. 1B, with the {0,1,0,1,0,1,0,1} LP bit assignment discussed above. The input signal 202 is provided to a first demodulator 204, which demodulates the incoming signal to produce the HP data signal. The demodulated HP data signal is then provided to a symbol decoder, which maps the demodulated signal value to a symbol. In the exemplary non-uniform 8PSK signal illustrated in FIG. 1B, this typically is implemented by determining which of the four constellation quadrants (I-IV) the demodulated data signal is located. The output symbols are then provided to a forward error correction (FEC) decoder 210, which corrects at least some of the potentially erroneous signals from the symbol decoder 208. Such erroneous signals can occur, for example, when additive noise or distortion of the data places the measurement close enough to an incorrect quadrant. This process is functionally analogous to that which is performed by legacy QPSK receivers tasked with decoding the QPSK signal shown in FIG. 1A.

The LP data signal 222 is obtained by the remaining elements illustrated in FIG. 2. A subtractor (or differencer) 214 computes the difference between the demodulated signal 206 and the HP data symbol 224 provided by the symbol decoder 208. This effectively removes the HP data signal, permitting the LP data signal to be demodulated by a second demodulator 216 and decoded by a second symbol decoder 218. The demodulated and decoded signal is then provided to a second FEC error decoder 220 to provide the LP data 222 signal. In the case of hierarchical non-uniform 8PSK signal, which is coherent between the HP and LP signals, demodulator 216 does not need to contain timing and carrier recovery functions of a complete demodulator.

Although the foregoing exemplary system 200 has been described with respect to separate (e.g. first and second) demodulators, symbol decoders, and error decoders, the system 200 can also be implemented by appropriate single functional elements performing the functions of multiple separate devices. Further, FIG. 2 represents an intuitive processing of hierarchical 8PSK. Alternately, a calculation of I-Q can be employed to improve performance.

In decoding a backwards-compatible hierarchically modulated signal, a two-step process is involved. In the first step, the "legacy" signal is processed. (The hierarchical signal is processed to obtain the HP data symbols with the LP signal component ignored as noise.) In the second step, the LP signal (e.g., new service signal) is processed. In a conventional method, symbol decisions are first made on the HP signal according to the quadrant in which the demodulated complex value resides. These "uncoded" symbol decisions could have a symbol error rate (SER) as high as 6%, operating at the CNR threshold. The LP signal is then extracted from the demodulated complex signal as a value relative to the uncoded symbol decisions. As a result, whenever an HP symbol decision is in error, the LP signal will pick up an error vector. Consequently, this error will degrade subsequent LP decoding performance in the form of an increased bit error rate (BER).

While the foregoing system 200 is capable of decoding both the HP data stream and the LP data stream, it does not make full use of the information that can be derived from the HP data stream to demodulate the LP data stream. The result is that the output LP data stream 222 is subject to some correctable errors.

Figure 3:
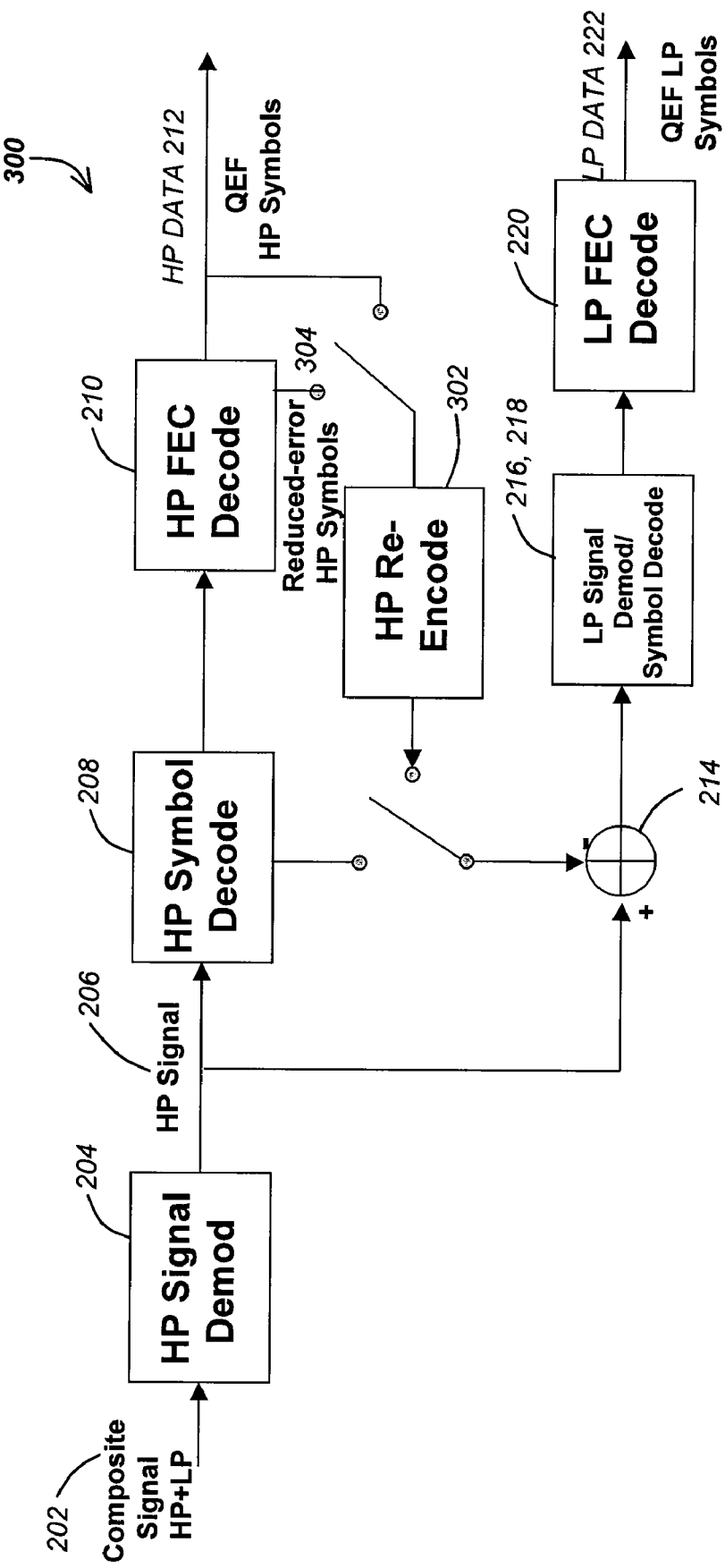
FIG. 3 is a diagram illustrating a system for demodulating a hierarchical non-uniform 8PSK signal resulting in fewer errors than the system illustrated in FIG. 2.

FIG. 3 is a block diagram illustrating another system 300 for demodulating a hierarchically modulated signal. Unlike the system shown in FIG. 2, the system illustrated in FIG. 3 makes full use of the decoded HP data in demodulating the LP data. Unlike the system 200 illustrated in FIG. 2, the differencer 214 computes the difference between the demodulated signal 206 and a version of the HP symbol stream that has been re-encoded by a re-encoder 302. Unlike the system 200 depicted in FIG. 2, in which only one symbol at a time is used to remove the HP data signal from the demodulated signal 206, the system 300 shown in FIG. 3 uses information from a plurality of symbols to remove the HP data. This is accomplished by using an FEC decoded and re-encoded version of the HP symbol stream 304.

Also as previously mentioned, in the case of hierarchical non-uniform 8PSK signal, which is coherent between the HP and LP signals, demodulator 216 does not need to contain timing and carrier recovery functions of a complete demodulator. Accordingly, the second demodulator 216 and second symbol decoder 220 are shown as a single block in FIG. 3.

While the foregoing system 300 has been described using FEC, other coding and error reduction schemes may also be used to practice the present invention. All that is required is that the decoding and recoding implemented in the system 300 be compatible with the coding used in the input signal 202. Current work in hierarchical demodulation systems has not taught this application of error reduction in the HP data 212 to improve demodulation of the LP data 222.

Figure 4:
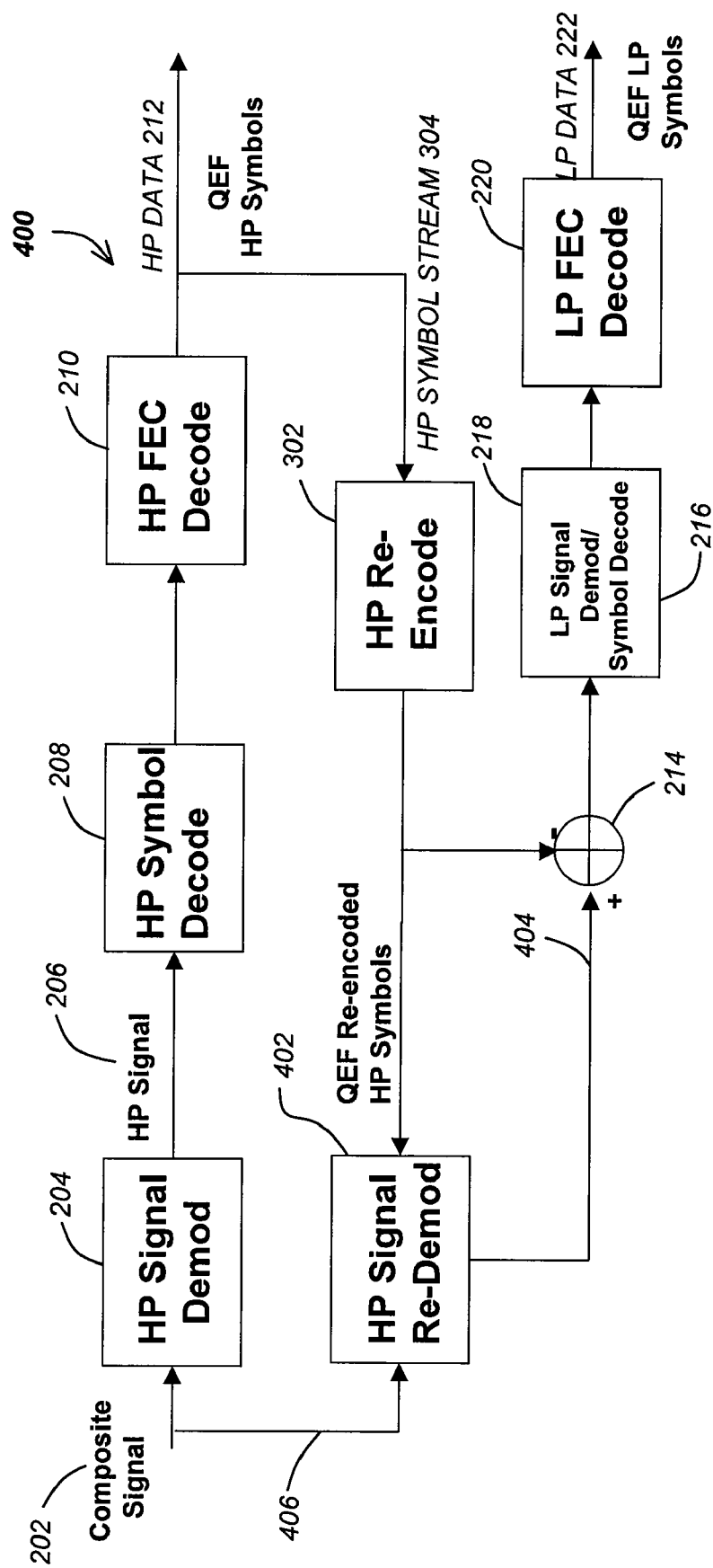
FIG. 4 is a block diagram of another embodiment of a system for demodulating the hierarchical non-uniform 8PSK signal.

FIG. 4 is a block diagram illustrating another embodiment of the present invention. This embodiment uses the demodulated and decoded HP data signal to improve performance characteristics of the demodulation of the input signal 202 that is used to recover the LP data signal. Here, the FEC decoded HP symbol stream 304 from the HP data 212 is provided to an FEC-corrected demodulator 402. The re-encoded signal permits the corrected-demodulator 402 to demodulate the input signal 202 with improved carrier/tracking recovery. This reduces errors and improves the BER of the LP data 222. As with the embodiment of FIG. 3, the embodiment of FIG. 4 also uses information from a plurality of symbols to remove the HP data because the HP symbols are applied after error correction.

Typical demodulators that can be employed for blocks 204, 216, and 402 are described in "Digital Communications, by Edward Lee and David G. Messerschmidt, 1994 on pp. 725-736 (carrier recovery) and pp. 737-764 (timing recovery), and "Digital Communication Receivers", by Heinrich Mayer et al., 1998 on pp. 79-88, both of which are hereby incorporated by reference herein.

In a separate FEC-corrected demodulator 402 shown in FIG. 4, the system 400 can be implemented by providing the FEC corrected and re-encoded HP symbol stream from the output of re-encoder 302 back to signal 406, this time without symbol decision errors. Further, FIGS. 2-4 illustrate embodiments that can receive and demodulate coherent and non-coherent HP and LP data signals. If the HP and LP signals are coherent, as in the case of hierarchical non-uniform 8PSK, the systems shown in FIGS. 2-4 can be simplified by greatly reducing or eliminating the LP signal demodulator 216. Accordingly, the second demodulator 216 and second symbol decoder 220 are shown as a single block in FIG. 4.

Figure 5:
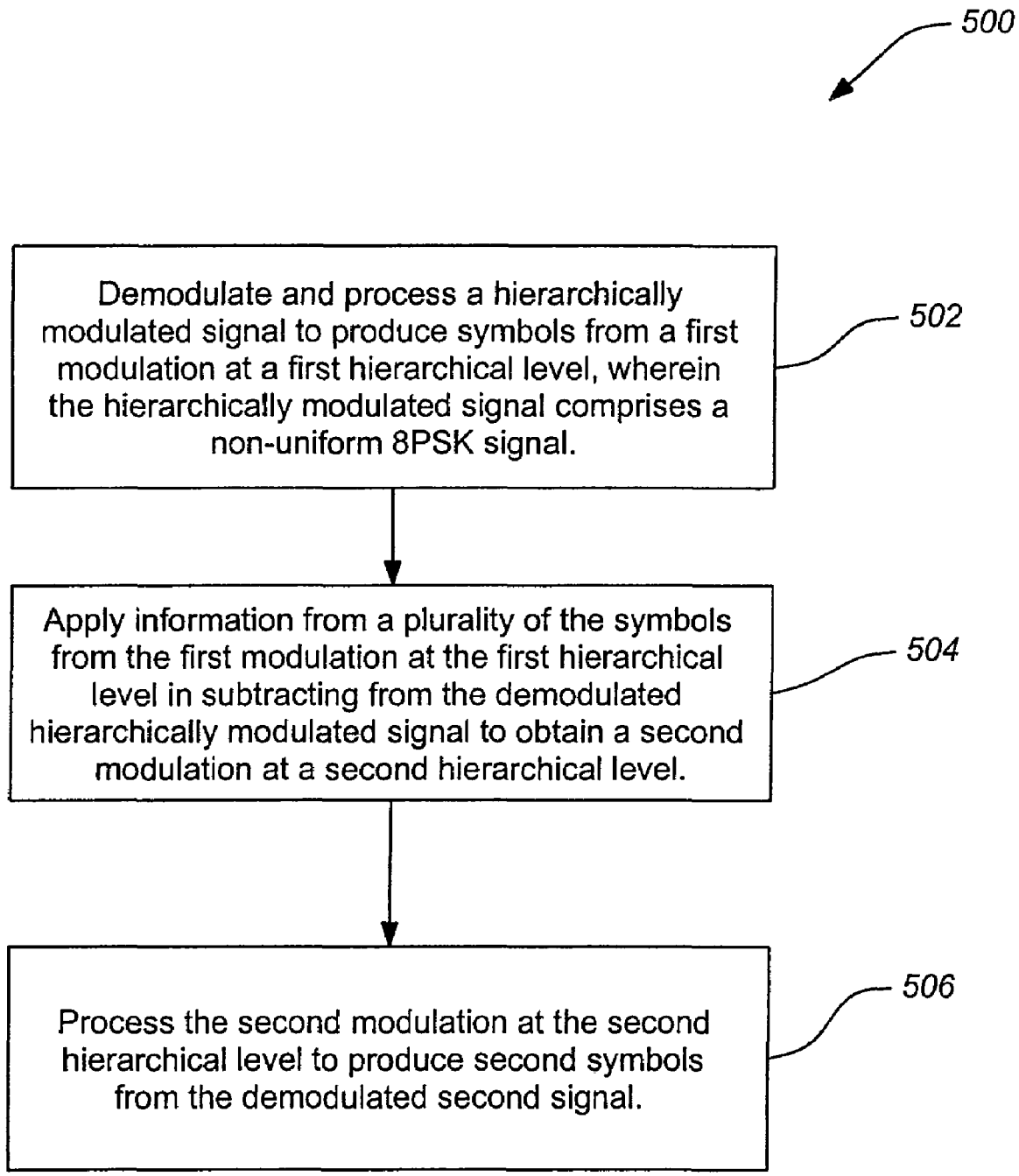
FIG. 5 is a flowchart of an exemplary method of the invention for demodulating a hierarchical non-uniform 8PSK signal.

FIG. 5 is a flowchart of an exemplary method 500 of the invention for demodulating a hierarchical non-uniform 8PSK signal. The method 500 begins at step 502 by demodulating processing a hierarchically modulated signal to produce symbols from a first modulation at a first hierarchical level. At step 504, information is applied from a plurality of the symbols from the first modulation at the first hierarchical level in subtracting from the demodulated hierarchically modulated signal to obtain a second modulation at a second hierarchical level. Finally at step 506, the second modulation at the second hierarchical level is processed to produce second symbols from the demodulated second signal. The hierarchically modulated signal comprises a non-uniform 8PSK signal. The applied information from the plurality of symbols from the first modulation can be achieved through application of the symbols from the first modulation after error correction, e.g. forward error correction (FEC) or some other technique to improve the accuracy of the output symbols from the first modulation. The exemplary method 500 may be further modified consistent with the exemplary receivers of FIGS. 2-4. For example, the step 504 can be implemented by providing an FEC corrected and re-encoded HP symbol stream from the output of a re-encoder to demodulate the incoming signal, this time without symbol decision errors.

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method for demodulating and decoding a hierarchically modulated signal having a first modulation at a first hierarchical level and a second modulation at a second hierarchical level, comprising the steps of:

demodulating and processing the hierarchically modulated signal to produce symbols from the first modulation at the first hierarchical level;

applying information from a plurality of the symbols from the first modulation at the first hierarchical level in subtracting from the demodulated hierarchically modulated signal to obtain the second modulation at the second hierarchical level; and processing the second modulation at the second hierarchical level to produce second symbols from the second modulation at the second hierarchical level;

wherein the hierarchically modulated signal is non-coherent and processing the second modulation at the second hierarchical level to produce second symbols further includes demodulating the second modulation at the second hierarchical level.

2. The method of claim 1, wherein applying information from the plurality of the symbols from the first modulation at the first hierarchical level comprises applying the symbols from the first modulation at the first hierarchical level after error correction.

3. The method of claim 2, wherein applying information from the plurality of the symbols includes performing an error corrected demodulation on the hierarchically modulated signal.

4. The method of claim 2, wherein the error correction comprises a forward error correction process.

5. The method of claim 1, wherein processing the hierarchically modulated signal to produce symbols from the first modulation at the first hierarchical level includes a decision-directed carrier recovery process.

6. The method of claim 1, wherein the plurality of the symbols from the first modulation at the first hierarchical level are re-encoded before being subtracted from the demodulated hierarchically modulated signal.

7. A receiver system for demodulating and decoding a hierarchically modulated signal having a first modulation at a first hierarchical level and a second modulation at a second hierarchical level, comprising:

a first demodulator for demodulating the first modulation of the hierarchically modulated signal;

a symbol decoder, communicatively coupled to the first demodulator, for producing symbols from the demodulated first signal;

an error decoder, communicatively coupled to the symbol decoder, for producing an error corrected symbol stream from the symbols from the demodulated first signal;

a re-encoder for re-encoding the error corrected symbol stream;

a subtractor, communicatively coupled to the re-encoder and the first demodulator, for subtracting the re-encoded symbol stream from the first signal to produce a second signal; and a second symbol decoder, communicatively coupled to the subtractor for producing second symbols from the second signal;

wherein the hierarchically modulated signal is non-coherent and the receiver system further comprises a second level demodulator, communicatively coupled between the subtractor and the second symbol decoder for demodulating the second signal from the subtractor and providing the demodulated second signal to the second symbol decoder.

8. The receiver system of claim 7, wherein the error decoder comprises a forward error correction decoder.

9. The receiver system of claim 7, wherein the hierarchically modulated signal comprises a non-uniform eight phase shift keyed signal.

\* \* \* \* \*